United States Patent
Srivastava et al.

(10) Patent No.: US 9,840,575 B2
(45) Date of Patent: Dec. 12, 2017

(54) HYDROPHILIC PREPOLYMER FOR POLYURETHANE FOAMS

(71) Applicant: Dow Global Technologies LLC, Midland, MI (US)

(72) Inventors: Yasmin N. Srivastava, Sugar Land, TX (US); Rogelio Gamboa, Brazoria, TX (US); Rajat Duggal, Pearland, TX (US)

(73) Assignee: Dow Global Technologies LLC

( * ) Notice: Subject to any disclaimer, the term of this patent is extended or adjusted under 35 U.S.C. 154(b) by 0 days.

(21) Appl. No.: 15/521,764

(22) PCT Filed: Oct. 26, 2015

(86) PCT No.: PCT/US2015/057295
§ 371 (c)(1),
(2) Date: Apr. 25, 2017

(87) PCT Pub. No.: WO2016/069437
PCT Pub. Date: May 6, 2016

(65) Prior Publication Data
US 2017/0260316 A1    Sep. 14, 2017

Related U.S. Application Data

(60) Provisional application No. 62/072,198, filed on Oct. 29, 2014.

(51) Int. Cl.
| | | |
|---|---|---|
| *C08G 18/12* | (2006.01) | |
| *C08J 9/00* | (2006.01) | |
| *C08G 18/08* | (2006.01) | |
| *C08G 18/76* | (2006.01) | |
| *C08G 18/48* | (2006.01) | |
| *A47C 27/14* | (2006.01) | |
| *A47G 9/10* | (2006.01) | |
| *C08G 101/00* | (2006.01) | |

(52) U.S. Cl.
CPC .............. *C08G 18/12* (2013.01); *A47C 27/14* (2013.01); *A47G 9/10* (2013.01); *C08G 18/14* (2013.01); *C08G 18/4804* (2013.01); *C08G 18/485* (2013.01); *C08G 18/4833* (2013.01); *C08G 18/7671* (2013.01); *C08J 9/00* (2013.01); *A47G 2009/1018* (2013.01); *C08G 2101/0058* (2013.01); *C08G 2101/0083* (2013.01); *C08J 2375/08* (2013.01)

(58) Field of Classification Search
CPC .. A47C 27/14; A47G 9/10; A47G 2009/1018; C08G 18/12; C08G 18/14; C08G 18/4804; C08G 18/4833; C08G 18/485; C08G 18/7671; C08G 2101/0058; C08G 2101/0083; C08J 9/00; C08J 2375/08
See application file for complete search history.

(56) References Cited

U.S. PATENT DOCUMENTS

| | | | |
|---|---|---|---|
| 5,231,116 A | 7/1993 | Sano et al. | |
| 5,650,450 A * | 7/1997 | Lovette | C08G 18/4833 521/112 |
| 5,686,502 A * | 11/1997 | Murray | C08G 18/4812 521/130 |
| 6,034,149 A | 3/2000 | Bleys et al. | |
| 2006/0058408 A1 | 3/2006 | Sam et al. | |
| 2006/0142529 A1 | 6/2006 | Thiede et al. | |
| 2007/0032561 A1 | 2/2007 | Lin et al. | |
| 2007/0179210 A1* | 8/2007 | Swaniker | A61F 13/00063 521/172 |
| 2012/0193572 A1 | 8/2012 | MacKay | |
| 2013/0000045 A1 | 1/2013 | Losio | |
| 2013/0104311 A1 | 5/2013 | Rensink et al. | |
| 2014/0141233 A1 | 5/2014 | Crawford et al. | |

FOREIGN PATENT DOCUMENTS

| | | |
|---|---|---|
| EP | 1749844 A1 | 2/2007 |
| WO | 02/068492 A1 | 9/2002 |
| WO | 2004074343 A1 | 9/2004 |
| WO | 2013076661 A1 | 5/2013 |
| WO | 2014/105690 A1 | 7/2014 |
| WO | 2014/105693 A1 | 7/2014 |

OTHER PUBLICATIONS

PCT/US2015/057295, dated Feb. 5, 2016, International Search Report and Written Opinion.
PCT//US2015/057295, dated May 2, 2017, International Preliminary Report on Patentability.

* cited by examiner

Primary Examiner — John Cooney

(57) ABSTRACT

A polyurethane foam for comfort application, includes the reaction product of a first composition that includes from 20 wt % to 80 wt % of an aqueous component and from 20 wt % to 80 wt % of a hydrophilic isocyanate-terminated prepolymer component. The aqueous component includes at least 90 wt % of water based on the total weight of the aqueous component and the hydrophilic isocyanate-terminated prepolymer component has a free NCO content from 1 wt % to 15 wt % and is a reaction product of a second composition that includes an isocyanate component and an isocyanate-reactive component. The isocyanate component includes at least 90 wt % of methylenediphenyl diisocyanate (MDI) and a weight ratio of 4,4'-methylene diphenylisocyanate isomer to 2,4'-methylene diphenylisocyanate isomer greater than 1:1 and less than 10:1, the isocyanate-reactive component including polyethylene glycol and a polyoxypropylene-polyoxyethylene polyol having a molecular weight of from 3000 g/mole to 7500 g/mole and a polyoxyethylene content of at least 50 wt %, and the hydrophilic isocyanate terminated prepolymer component having an polyoxyethylene content from 45 wt % to 75 wt %, based on the total weight of the second composition.

10 Claims, No Drawings

HYDROPHILIC PREPOLYMER FOR POLYURETHANE FOAMS

FIELD

Embodiments relate to a hydrophilic prepolymer for use in forming a polyurethane foam layer for comfort applications. Exemplary comfort applications include pillows, mattress toppers, and mattresses.

INTRODUCTION

Polyurethane polymers formed using isocyanate-terminated prepolymers derived from methylenediphenyl diisocyanate (MDI) are discussed in International Publication No. WO 2004/074343. However, hydrophilic prepolymers for use in forming polyurethane foams specifically optimized for use in comfort applications are sought. In particular, polyurethane foams in pillows, mattresses toppers, and mattresses have a tendency to store heat, which has the disadvantage of the user feeling an uncomfortable rise in temperature during use.

SUMMARY

Embodiments may be realized by providing a polyurethane foam for comfort application that includes the reaction product of a first composition that has from 20 wt % to 80 wt % of an aqueous component and from 20 wt % to 80 wt % of a hydrophilic isocyanate-terminated prepolymer component. The aqueous component includes at least 90 wt % of water based on the total weight of the aqueous component, and the hydrophilic isocyanate-terminated prepolymer component has a free NCO content from 1 wt % to 15 wt % and is a reaction product of a second composition that includes an isocyanate component and an isocyanate-reactive component. The isocyanate component includes at least 90 wt % of methylenediphenyl diisocyanate (MDI) and a weight ratio of 4,4'-methylene diphenylisocyanate isomer to 2,4'-methylene diphenylisocyanate isomer greater than 1:1 and less than 10:1, the isocyanate-reactive component includes polyethylene glycol and a polyoxypropylene-polyoxyethylene polyol having a molecular weight of from 3000 g/mole to 7500 g/mole and a polyoxyethylene content of at least 50 wt %, and the hydrophilic isocyanate-terminated prepolymer component has an polyoxyethylene content from 45 wt % to 75 wt %, based on the total weight of the second composition.

DETAILED DESCRIPTION

Embodiments relate to a polyurethane based foam that is formed using a hydrophilic prepolymer. By hydrophilic prepolymer it is meant an isocyanate-terminated prepolymer based on polyurethane chemistry (i.e., reaction of an isocyanate moiety with an active hydrogen group such as a hydroxyl group) that is relating to or has a strong affinity for water, as opposed to a hydrophobic prepolymer. By polyurethane based foam used in comfort applications, it is meant a foam that utilizes polyurethane reactive chemistry for use as surface toppers or core materials to improve thermal comfort and moisture in comfort applications such as pillows and mattresses. With respect to the embodiments, the foam is defined as a non-gel based reaction product of at least an isocyanate-terminated prepolymer and water. Improved thermal comfort is defined as exhibiting a specific heat that is greater than 2.0 J/g*° C. (e.g., from 2.1 to 8.0 J/g*° C., from 2.2 to 4.0 J/g*° C., from 2.5 to 3.5 J/g*° C., from 2.7 to 3.2 J/g*° C., etc.) and a thermal conductivity that is greater than 0.05 Watt/m*° K. (e.g., from 0.05 to 0.200, from 0.08 to 0.180, etc.).

The foam may have a density ranging from 4.0 to 9.0 lb/ft$^3$. With respect to measured water uptake, the foam may exhibit from 300% to 700% change in weight after submersion in water for one minute at room temperature. The foam may exhibit an air flow from 1.5 to 3.5 scfm. The foam may exhibit a surface temperature of less than 24.5° C. when maintained at room temperature for a period of 24 hours. For example, if room temperature is 23° C., the foam may exhibit a surface temperature of less than 23° C. (e.g., from 20.0° C. to 22.8° C.), so as to be less than room temperature. If room temperature is 22° C., the foam may exhibit a surface temperature of only 0.2° C. to 2.0° C. (e.g., 0.2° C. to 1.0° C., 0.2° C. to 1.0° C., 0.2° C. to 0.5° C., etc.) less than room temperature.

The polyurethane foam is a reaction product of a composition that includes at least an aqueous component and a hydrophilic isocyanate-terminated prepolymer component. In addition, the composition for forming the polyurethane foam may include an additive component in amount from 0.1 wt % to 10 wt %. For example, the additive component may include surfactant(s), dye(s), pigment(s), fragrance(s), anti-oxidant(s), and/or catalyst(s).

The hydrophilic isocyanate-terminated prepolymer component has a free NCO content from 1 wt % to 15 wt % (e.g., 5 wt % to 10 wt %, 6 wt % to 8 wt %, etc.) and is a reaction product of an isocyanate component and an isocyanate-reactive component. The isocyanate component including at least 90 wt % (e.g., at least 95 wt % and/or at least 99 wt %) of methylenediphenyl diisocyanate (MDI) and a weight ratio of 4,4'-methylene diphenylisocyanate isomer to 2,4'-methylene diphenylisocyanate isomer greater than 1:1 and less than 10:1. In particular, the amount of 4,4'-methylene diphenylisocyanate isomer is greater than the amount of the 2,4'-methylene diphenylisocyanate isomer (e.g., 2 to 8 times greater, 3 to 7 times greater, 3 to 6 times greater, and/or 3 to 5 times greater). The isocyanate-reactive component includes polyethylene glycol and a polyoxypropylene-polyoxyethylene polyol, whereas the polyoxypropylene-polyethylene polyol has a molecular weight of from 3000 g/mole to 7000 g/mole (e.g., 4000 g/mole to 6000 g/mol) and a polyoxyethylene content of at least 50 wt % (e.g., from 55 wt % to 85 wt %, from 60 wt % to 80 wt %, from 65 wt % to 80 wt %, from 70 wt % to 80 wt %, and/or from 74 wt % to 76 wt %). The hydrophilic isocyanate-terminated prepolymer component has an overall polyoxyethylene content from 45 wt % to 75 wt % (e.g., from 50 wt % to 75 wt %, from 55 wt % to 70 wt %, and/or from 60 wt % to 65 wt %), based on the total weight of the second composition.

Aqueous Component

The aqueous component accounts for 20 wt % to 80 wt % of the total weight of the composition for forming the polyurethane foam. For example, the aqueous component is present in an amount from 30 wt % to 70 wt %, 40 wt % to 60 wt %, and/or from 45 wt % to 55 wt %, based on the total weight of the composition for forming the polyurethane foam. The aqueous component is at least 90 wt % of water, based on the total weight of the aqueous component. In addition to water, the aqueous component may include at least one additives, such as a filler, solvent, flame retardant, and/or other additives known in the art for use in polyurethane foams.

Hydrophilic Isocyanate-Terminated Prepolymer Component

The hydrophilic isocyanate-terminated prepolymer component accounts for 20 wt % to 80 wt % of the total weight of the composition for forming the polyurethane foam. For example, the hydrophilic isocyanate-terminated prepolymer component is present in an amount from 30 wt % to 70 wt %, 40 wt % to 60 wt %, and/or from 45 wt % to 55 wt %, based on the total weight of the composition for forming the polyurethane foam. The hydrophilic isocyanate-terminated prepolymer component is the reaction product of a composition for forming the prepolymer that includes the isocyanate component and the isocyanate-reactive component.

The isocyanate component includes at least 90 wt % of MDI, of which the amount of the 4,4'-methylene diphenylisocyanate isomer is greater than the amount of the 2,4'-methylene diphenylisocyanate isomer. According to exemplary embodiments, a balance of the isocyanate component that is not accounted for with the 4,4' isomer of MDI and/or the 2,4' isomer of MDI may include toluene diisocyanate, hexamethylene diisocyanate, isophorone diisocyanate, polymethylene polyphenylisocyanate, carbodiimide or allophonate or uretonimine adducts of methylene diphenylisocyanate, and mixtures thereof. In exemplary embodiments, the isocyanate component consists essentially of MDI, such that toluene diisocyanate is excluded from the hydrophilic isocyanate-terminated prepolymer component. The isocyanate component may be present in an amount from 30 wt % to 60 wt %, based on the total weight of the composition for forming the prepolymer.

The isocyanate-reactive component includes polyethylene glycol (also known as PEG and polyoxyethylene glycol). The polyethylene glycol may have a number average molecular weight from 500 g/mol to 2000 g/mol (e.g., from 500 g/mol to 1500 g/mol, from 750 g/mol to 1250 g/mol, from 900 g/mol to 1100 g/mol, etc.). The polyethylene glycol may be the primary component in the composition for forming the prepolymer. By primary component it is meant that the amount of that component is greater than the amount of each of the other components (i.e., the polyethylene glycol has the highest weight percentage within the composition for forming the prepolymer). The polyethylene glycol may account for 40 wt % to 65 wt % (e.g., 45 wt % to 65 wt %, 45 wt % to 60 wt %, 50 wt % to 55 wt %, etc.) of the total weight of the composition. The amount of the polyethylene glycol may be greater than the total amount of the isocyanate component.

The isocyanate-reactive component further includes a polyoxypropylene-polyoxyethylene polyol having a molecular weight of from 3000 g/mole to 7500 g/mole and a polyoxyethylene content of at least 50 wt %, based on a total weight of the polyoxyethylene-polyoxypropylene polyol). The polyoxypropylene-polyoxyethylene polyol may have a nominal hydroxyl functionality from 1.6 to 8 (e.g., 1.6 to 3.5). A remainder of the weight content of the polyoxyethylene-polyoxypropylene polyol based on a total of 100 wt % is accounted for with polyoxypropylene, e.g., the polyoxypropylene content is at least 5 wt % in the polyol. For example, the polyoxyethylene content is from 55 wt % to 85 wt %, from 60 wt % to 80 wt %, from 65 wt % to 80 wt %, from 70 wt % to 80 wt %, and/or from 74 wt % to 76 wt %, with the remainder being polyoxypropylene. The composition for forming the prepolymer may include a minimum of 2 wt % (e.g., from 2 wt % to 10 wt %, from 2 wt % to 7 wt %, from 2 wt % to 5 wt %, and/or from 3 wt % to 5 wt %) of the total weight of the composition for forming the prepolymer.

The isocyanate-reactive component may include at least one other polyether polyol. The at least one other polyether polyol may have an average nominal hydroxyl functionality from 1.6 to 8 (e.g., 1.6 to 3.5) and a number average molecular weight from 1000 to 12,000 (e.g., 1,000 to 8,000, 1,200 to 6,000, 2,000 to 5,500, etc.). Further, combinations of other polyether polyols, including monohydroxyl substances and low molecular weight diol and triol substances or amines, of varying functionality and polyoxyethylene content may be used in the composition for preparing the prepolymer.

Additives (such as additives known in the art for use in forming prepolymers and polyurethanes) may be used in the preparation of the prepolymer component. For example, the composition for forming the prepolymer component may include at least one catalyst, at least one crosslinker, and/or at least one chain extender.

The hydrophilic prepolymer has an polyoxyethylene content from 45 wt % to 75 wt %, based on the total weight of the composition for forming the prepolymer. The free NCO content of the hydrophilic prepolymer may be from less than 15 wt %, less than 10 wt %, and/or less than 8 wt % (e.g., from 5 wt % to 15 wt %, 5 wt % to 13 wt %, 6 wt % to 11 wt %, 6 wt % to 8 wt %, 6.5 wt % to 7.5 wt %, etc.). Polyisocyanate may be back blended into the MDI based prepolymer to reach the desired free NCO content.

The hydrophilic prepolymer component may be prepared by combining the isocyanate component and the polyol component at 20-100° C. If desired, the hydrophilic prepolymer component may be prepared in the presence of urethane-forming catalyst, such as a tertiary amine or tin compound. The relative amounts of total diisocyanates and total polyols may be chosen so as to arrive at a desired free NCO content of the prepolymer. The equivalent amount of diisocyanate may be higher than the equivalent amount of the polyol. The preparation of the prepolymer may be known to those skilled in the art.

Composition

Hydrophilic polyurethane foam may prepared by contacting under reaction conditions the isocyanate-terminated prepolymer with the aqueous component. The aqueous component primary includes water and might include minor amounts of additives such as surfactant(s), catalyst(s), a thickening agent(s), color pigment(s), filler(s), anti-oxidant(s), and/or fragrances. In exemplary embodiments, the polyurethane foam is prepared in the absence of any catalysts. In making the polyurethane foam, the ratio of the amount of isocyanate-terminated prepolymer to the aqueous mixture may vary over a range depending on the target density of the resulting polymer and its associated physical parameters and/or on the isocyanate content of the composition. In embodiments, the polyurethane foam is the reaction product of a composition that includes 20 wt % to 80 wt % of an aqueous component and from 20 wt % to 80 wt % of a hydrophilic isocyanate-terminated prepolymer component.

When intending to prepare a hydrophilic foam, typically 100 parts by weight of the isocyanate-terminated prepolymer will be mixed and reacted with from 10 to 500 (e.g., 50 to 300 and/or 50 to 150) parts by weight of an aqueous phase. In an exemplary embodiment of preparing the hydrophilic prepolymer, the isocyanate-terminated prepolymer component is brought to the aqueous phase. For example, a 0.5 to 5 wt % solution of the surfactant in water (i.e., aqueous component) at a temperature from 5° C. to 50° C. is introduced to the isocyanate-terminated prepolymer.

Then, the resultant mixture is dispensed into a closed mold, open mold or continuous line pour area, and allowed to react out.

Surfactants may be chosen to provide a foam, e.g., good appearance of cell structure and size. Surfactants may minimize collapse and/or foam deformations (such as splitting). Examples of surfactants include polyether silicone surfactants, such as those known to those of ordinary skill in the art. Surfactants may be present in the aqueous phase in an amount of from 0.5 to 4.0 (e.g., 0.7 to 3.0, 0.8 to 2.0, 0.9 to 1.5, and/or 0.9 to 1.2), parts by weight per 100 parts by weight of the total aqueous component including the surfactant.

The solution of the surfactant and aqueous component may include or have added thereto (e.g., before adding the isocyanate-terminated prepolymer or after adding the isocyanate-terminated prepolymer) other optional additive(s). The optional additive(s) may include at least one catalyst, e.g., that may be added in an amount to modify the curing time of the reaction product and facilitate in attaining the desired physical attributes of the foam. Suitable catalysts include, e.g., substances known in the art for promoting the reaction of an isocyanate with a polyol. For example, the catalyst may include a sodium bicarbonate, a tertiary amine, and/or an organometallic compound. Exemplary catalysts include n-methyl morpholine, n-ethyl morpholine, trimethylamine, triethylamine, tetramethyl butane diamine, triethylenediamaine, dimethylaminoethanolamine, benzylidimethylamine, dibutyl tin dilaurate, and stannous octoate. Other optional additives include fillers, phase change materials, fibers, textiles, fatty oils, crosslinkers, and/or functional additives, which may be present (e.g., in the prepolymer-reactive component) when modified physical properties are sought. The fillers may include natural and/or synthetic materials. Exemplary fillers include wood based materials, cork based materials, silicate based materials, glass based materials, and mineral based materials. Other optional additives present may be fragrances, perfumes, and/or other substances that may be detected by scent.

Thickening agents may be present when it is desired to control the viscosity of the aqueous phase and facilitate the transportation and distribution of, e.g., fillers or fibers. Exemplary of typical fillers includes clays, diatomaceous earth, calcium carbonate, and mineral fibers such as wallastonite; aqueous latexes such as for example a styrene-butadiene. Examples of thickening agents are natural products such as xanfhan gums, or chemical agents such as polyacrylamide polymers and gels as sold by The Dow Chemical Company. Other additives that may be present include mixing aids and notably emulsifiers. The aqueous component may be used to introduce to other substances, such as fatty oils and functional additives, besides fibers and fillers, when desiring to modify physical properties of the resulting polymer.

According to an exemplary embodiment, the polyurethane usable for comfort application, e.g., so as to form a cooling foam forming composition for use as a polyurethane layer in materials such as viscoelastic polyurethane foams (such as viscoelastic foam based mattresses and pillows) and/or use as a polyurethane foam layer on a surface of materials such as viscoelastic polyurethane foams. The cooling foam can be also included on the surface as inserts in the pillow, mattress topper, or mattress.

All parts and percentages herein are by weight, unless otherwise indicated. All descriptions of molecular weight are based on a number average molecular weight, unless otherwise indicated

EXAMPLES

The following materials are principally used:

MDI Prepolymer 1

MDI Prepolymer 1 A diphenylemethane diisocyanate (MDI) based prepolymer having a target average isocyanate moiety (NCO) content of 7 wt % and a an overall EO content calculated as 62 wt % (based on the total weight of the formulation), that is prepared according to the approximate formulation in Table 1, below:

TABLE 1

|  | Prepolymer Formulation 1 (wt %) |
|---|---|
| ISONATE ™ 125M | 21 |
| ISONATE ™ 50 O,P | 14 |
| CARBOWAX ™ PEG 1000 | 52 |
| VORANOL ™ CP-1421 | 13 |
| Benzoyl Chloride | <0.01 |

ISONATE ™ 125M A MDI based mixture including on average 98 wt % 4,4'-diphenylmethane diisocyanate and 2 wt % of 2,4'-diphenylemethane diisocyanate and having an average NCO content of 33.5 wt % (available from The Dow Chemical Company).
ISONATE ™ 50 O,P A MDI based mixture including on average 50 wt % 4,4'-diphenylmethane diisocyanate and 50 wt % of 2,4'-diphenylemethane diisocyanate and having an average NCO content of 33.5 wt % (available from The Dow Chemical Company).
CARBOWAX ™ PEG 1000 A polyethylene glycol (PEG), having an average nominal hydroxyl functionality of 2 and a number average molecular weight of approximately 1000 g/mole (available from The Dow Chemical Company).
VORANOL ™ CP-1421 A polyoxyethylene/polyoxypropylene polyol initiated with glycerol, having an average nominal hydroxyl functionality of 3, an average hydroxyl number of 33 KOH/g, an average polyoxyethylene content of 75 wt %, and a number average molecular weight of approximately 5,000 g/mole (available from The Dow Chemical Company).
Benzoyl Chloride A 99 wt % solution of benzoyl chloride (available from Sigma-Aldrich).

MDI Prepolymer 1 with a target average NCO content of 7 wt % is prepared according to Table 1, above. The NCO content is measured according to ASTM D5155.

With respect to the Prepolymer Formulation 1, the required amount of CARBOWAX™ PEG 1000 and VORANOL™ CP-1421, according to Table 1, above, are added to a reactor to form a first mixture that is heated to 80° C. with continuous stirring and nitrogen purging overnight. Then, after the water content is measured to make sure it is less than 250 ppm, Benzoyl Chloride is added to the first mixture to form a second mixture. Thereafter, the second mixture is stirred for 15 min. Also, ISONATE™ 125M and ISONATE™ 50 O,P are added to a four neck flask to form a third mixture, which is heated to 55° C. Next, the second mixture is added to the third mixture, and the resultant mixture is heated to 75° C. and maintained at that temperature for three hours. Thereafter, the temperature of the resultant mixture is lowered down to less than 60° C. and the prepolymer is dispensed into a glass bottle.

MDI Prepolymer A

MDI Prepolymer A A diphenylemethane diisocyanate (MDI) based prepolymer having an isocyanate content of 6.5% and an overall EO content calculated as 37.5 wt % (based on the total weight of the formulation), that is prepared according to the approximate formulation in Table 2, below:

TABLE 2

|  | Prepolymer Formulation 1 (wt %) |
| --- | --- |
| ISONATE ™ 125M | 21.14 |
| ISONATE ™ 50 O,P | 5.28 |
| UCON PCL 270 | 51.51 |
| DNC 779.01 | 22.07 |
| Benzoyl Chloride | <0.01 |

ISONATE ™ 125M A MDI based mixture including on average 98 wt % 4,4'-diphenylmethane diisocyanate and 2 wt % of 2,4'-diphenylemethane diisocyanate and having an average NCO content of 33.5 wt % (available from The Dow Chemical Company).
ISONATE ™ 50 O,P A MDI based mixture including on average 50 wt % 4,4'-diphenylmethane diisocyanate and 50 wt % of 2,4'-diphenylemethane diisocyanate and having an average NCO content of 33.5 wt % (available from The Dow Chemical Company).
UCON ™ PCL-270 A lubricant polyol of a polyalkylene glycol monobutyl ether, having an average nominal hydroxyl functionality of 2, an average polyoxyethylene content of 65 wt %, and a number average molecular weight of approximately 2,600 g/mole (available from The Dow Chemical Company).
DNC 779.01 A polyoxyethylene/polyoxypropylene polyol initiated with Bis-3-aminopropylmethylamine, having an average nominal hydroxyl functionality of 4, an average polyoxyethylene content of 17.5 wt %, and a number average molecular weight of approximately 6,800 g/mole (available from The Dow Chemical Company).
Benzoyl Chloride A 99 wt % solution of benzoyl chloride (available from Sigma-Aldrich).

MDI Prepolymer A with a target average NCO content of 6.5 wt % is prepared according to Table 2, above. The NCO content is verified according to ASTM D5155.

With respect to the Prepolymer Formulation 1, the required amount of UCON™ PCL-270, and DNC 779.01 polyol, according to Table 2, above, are added to a reactor to form a first mixture that is heated to 80° C. with continuous stirring and nitrogen purging overnight. Then, the second mixture is stirred for 15 min. Next, ISONATE™ 125M and ISONATE™ 50 O,P is added to a four neck flask to form a third mixture, which is heated to 55° C. Next, the second mixture is added to the third mixture, and the resultant mixture is heated to 75° C. and maintained at that temperature for three hours. Thereafter, the temperature of the resultant mixture is lowered down to less than 60° C. and the prepolymer is dispensed into a glass bottle.

Comparative Formulation
Comparative Formulation A composition that has an overall EO content calculated as approximately 3 wt % (based on the total weight of the formulation), that is prepared according to the approximate formulation in Table 3, below:

TABLE 3

|  |  | Comparative Formulation (wt %) |
| --- | --- | --- |
| Isocyanate Component | MDI | 27.0 |
|  | TDI | 3.0 |
| Polyols in Isocyanate-Reactive Component | VORANOL ™ 3150 | 48.1 |
|  | VORANOL ™ 3136 | 7.1 |
|  | VORANOL ™ 4053 | 1.6 |
|  | VORALUX ™ HL 431 | 8.0 |
| Additives in Isocyanate-Reactive Component | DP 1022 | 0.3 |
|  | ICL Fyrol FR-2 | 2.8 |
|  | NIAX ® L-618 | 0.6 |
|  | Dabco ® 33 LV | 0.1 |
|  | Dabco ® BL-11 | 0.1 |
|  | Dabco ® T-9 | <0.1 |
|  | Water | 1.4 |

MDI A MDI based mixture including containing high quantities of monomeric Methylene Diphenyl Diisocyanate (MMDI) isomers with an average NCO functionality of from 2.2-2.3.
TDI A toluene diisocyanate (TDI) that includes a mixture of the 2,4 and 2,6 isomers of TDI in a ratio of 80 wt % to 20 wt % (available from The Dow Chemical Company as VORANATE ™ T-80).
VORANOL ™ 3150 A polyoxypropylene triol, having a number equivalent molecular weight of approximately 336 g/mole equivalence (available from The Dow Chemical Company).

TABLE 3-continued

|  | Comparative Formulation (wt %) |
| --- | --- |

VORANOL ™ 3136 A polyoxyethylene/polyoxypropylene triol, having an EO content of approximately 11 wt % and a number equivalent molecular weight of approximately 1030 g/mole equivalence (available from The Dow Chemical Company).
VORANOL ™ 4053 A polyoxyethylene/polyoxypropylene polyol, having an hydroxyl functionality of approximately 6.9, an EO content of approximately 75 wt %, and a number equivalent molecular weight of approximately 1795 g/mole equivalence (available from The Dow Chemical Company).
VORALUX ™ HL 431 A grafted polyether polyol containing copolymerized styrene and acrylonitrile, having a hydroxyl functionality of approximately 3, a number equivalent molecular weight of approximately 1810 g/mole equivalence, and an EO content of approximately 7.0 wt % (available from The Dow Chemical Company).
DP 1022 A reactive polyfunctional additive (available from Momentive).
ICL Fyrol FR-2 A tris(1,3-dichloro-2-propyl) phosphate flame retardant (available from TRI-ISO).
NIAX ® L-618 A polyalkyleneoxidemethylsiloxane Copolymer (available from Momentive).
Dabco ® 33 LV A tertiary amine catalyst (available from Air Products).
Dabco ® BL-11 A tertiary amine catalyst (available from Air Products).
Dabco ® T-9 A tin catalyst (available from Air Products).

Preparation of Foam Examples

Foams samples are prepared using MDI Prepolymer 1 and MDI Prepolymer A according to the following formulation in Table 4, below:

TABLE 4

|  | Example 1 (wt %) | Example A (wt %) |
| --- | --- | --- |
| MDI Prepolymer 1 | 50 | — |
| MDI Prepolymer A | — | 50 |
| Water | 49 | 49 |
| Surfactant | 1 | 1 |

The Surfactant is Silwet® L-7605, a polyether silicone surfactant available from Momentive Performance Materials.

The foam samples of Example 1 and Example A are prepared by adding the A-side (MDI Prepolymer 1 or A) and the B-side (1 wt % solution of the Surfactant in 49 wt % of water) to a mixing cup in the ratio of 1:1 (prepolymer: aqueous component ratio). The components are mixed using a lab scale speed mixer for 20 seconds at 2000 rpm and ambient temperature. The reaction mixture is poured in to a mold lined with a polyethylene sheet. Once foaming is complete, the foam is allowed to cure overnight under a fume hood. Skin layers of the foams are discarded, and the remainder of the sample is characterized. The foam is conditioned for at least 24 hours prior to testing.

A foam sample of the Example B, the Comparative Formulation, is prepared through box foaming using a 38 cm×38 cm×24 cm (or about 15"×15"×9.5") wooden box lined with a thin plastic film lining. A high shear mixer (4 pins in each of the four radially extending directions) at high rotation speed is used to mix the components in a 1-gallon container at ambient temperature. Formulation total mass was 2.5 kg for VE foam formulations at ~1.3 pphp water. The isocyanate-reactive component, with the exception of the tin catalyst, are first mixed for 15 seconds (2400 RPM). Then, the tin catalyst is added and immediately mixed for another 15 seconds (2400 RPM). Next, the isocyanate component is added to the mixture and immediately mixed for another 4 seconds (3000 RPM). Then, the entire mixture is poured into the box lined with the plastic film. Once foaming is complete, the foam is further allowed to cure overnight under the flame hood. Skin layers of the foams are discarded, and the remainder of the sample is characterized. The foam is allowed to set for at least 24 hours prior to testing.

Evaluation of Examples

Examples 1, A, and B are evaluated for the following approximate properties:

TABLE 5

| | Density (lb/ft³) | Water Uptake (wt %) | Air Flow (scfm) | Thermal Conductivity (Btu * in/ hr * ft² * ° F.) | Thermal Conductivity Watt/(m * °K) | Tear Strength (lbf/inch) | Specific Heat (J/g * ° C.) | Surface Temperature (° C.) |
|---|---|---|---|---|---|---|---|---|
| Ex. 1 | 6.8 | 500 | 1.3 | 0.66 | 0.095 | 6.0 | 3.0 | 22.5 |
| Ex. A | 8.6 | 174 | 0.8 | 0.30 | 0.043 | 2.6 | 1.63 | 24.0 |
| Ex. B | 4.0 | 40 | 0.2 | 0.26 | 0.037 | 0.8 | 2.0 | 24.5 |

*N/A: Not available

Density is measured according to ASTM D3574.

Water uptake is measured on dried/conditioned foam samples that are cut into 2×2×1 inch pieces. Weight of the foam samples are measured before and after immersion in water for one minute. Weight of the wet foam sample is measured after pat drying for 30 seconds. In particular, water uptake is measured using the following formula:

Water uptake %=Weight$_{pat\ dry}$−Weight$_{dry}$/Weight$_{dry}$

Thermal conductivity is measured as the quantity of heat transmitted in BTUs per foot and hour through a thickness in a direction normal to a surface of unit are, due to a unit temperature gradient under steady state conditions (e.g., Btu*in/hour*ft²*° F. or Watt/(m*° K.)). The conversion from [Btu*in/hour*ft²*° F.] to [Watt/(m*° K.)] would be understood by a person of ordinary skill in the art (e.g., as a multiplication factor of approximately 0.144). Thermal conductivity measurements are performed using a Laser Comp Heat Flow Meter, on the basis of Fourier's Law, otherwise known as the Law of Heat Conduction. Measurements are made by placing a foam sample between two flat, isothermal plates, which are maintained at two different temperatures (dT). Typically, one plate is referred to as the "hot plate", and the other plate is referred to as the "cold plate". Heat flux measurements are carried at a mean test temperature of 75° F. and 40° F. test temperature differentials. The Laser Comp Heat Flow meters measure heat flow in only one direction, so Fourier's Law can be simply stated as the following:

$q=-\lambda(dT/dx)$ or $\lambda=-q(dx/dT)$ where: q=heat flux (W/m2 or BTU/ft2); λ=thermal conductivity (W/m-K or BTU/hr-ft-F); and dT/dx=temperature gradient in the x direction (K/m or F/ft).

Tear resistance of dry samples are measured according to ASTM D3574, Test F on sliced foam samples of having the following dimensions: 6×1×1" w/1.5 inch slit, with crosshead travel speed of 500 mm/min (20"/min). Four specimens were recorded for each sample, and the reported value is an average.

Specific heat is measured as the amount of heat in Joules per gram of the material required to raise the temperature of the material by one degree Celsius. Specific heat measurements are performed using a DSC Q2000 Series-0205, available from TA Instruments. Both sapphire and sample runs are performed in Isothermal mode for 10.00 min (modulated DSC mode). Once samples are analyzed, the corrected factor for the sapphire is multiplied by the value of each foam sample to provide a heat capacity measurement. As would be understood by a person of ordinary skill in the art, KCp=Cp of sapphire known/Cp of sapphire is observed. The known sapphire at 25° C. is 0.7729 J/(g).

Surface temperature of the foam samples is measured after exposing the sample to 24 hours at ambient temperature, using a handheld infrared thermometer from Raytek Raynger.

The invention claimed is:

1. A polyurethane foam for comfort application, comprising:
    the reaction product of a first composition that includes from 20 wt % to 80 wt % of an aqueous component and from 20 wt % to 80 wt % of a hydrophilic isocyanate-terminated prepolymer component, wherein:
    the aqueous component includes at least 90 wt % of water based on the total weight of the aqueous component, and
    the hydrophilic isocyanate-terminated prepolymer component has a free NCO content from 1 wt % to 15 wt % and is a reaction product of a second composition that includes an isocyanate component and an isocyanate-reactive component, the isocyanate component including at least 90 wt % of methylenediphenyl diisocyanate (MDI) and a weight ratio of 4,4'-methylene diphenylisocyanate isomer to 2,4'-methylene diphenylisocyanate isomer greater than 1:1 and less than 10:1, the isocyanate-reactive component including polyethylene glycol and a polyoxypropylene-polyoxyethylene polyol having a molecular weight of from 3000 g/mole to 7500 g/mole and a polyoxyethylene content of at least 50 wt %, and the hydrophilic isocyanate-terminated prepolymer component having an polyoxyethylene content from 45 wt % to 75 wt %, based on the total weight of the second composition.

2. The polyurethane foam as claimed in claim 1, wherein the polyethylene glycol is the primary component in the second composition.

3. The polyurethane foam as claimed in claim 2, wherein the second composition includes from 40 wt % to 65 wt % of the polyethylene glycol, based on the total weight of the second composition.

4. The polyurethane foam as claimed in claim 3, wherein the polyethylene glycol has a number average molecular weight from 500 g/mol to 2000 g/mol.

5. The polyurethane foam as claimed in claim 4, wherein the polyoxypropylene-polyoxyethylene polyol accounts for 5 wt % to 25 wt % of the total weight of the second composition.

6. A pillow including a layer formed of the polyurethane foam as claimed in claim 5, wherein the layer has a density from 4.0 lb/ft³ to 9.0 lb/ft³, a water uptake from 300% to 700% based on change in weight after submersion in water for one minute at room temperature, and an air flow from 1.5 to 3.5 scfm.

7. A mattress including a layer formed of the polyurethane foam as claimed in claim 5, wherein the layer has a density from 4.0 lb/ft³ to 9.0 lb/ft³, a water uptake from 300% to 700% based on change in weight after submersion in water for one minute at room temperature, and an air flow from 1.5 to 3.5 scfm.

8. A viscoelastic foam product that includes the polyurethane foam as claimed in claim 1.

9. A pillow including a layer formed of the polyurethane foam as claimed in claim 1, wherein the layer has a density from 4.0 lb/ft³ to 9.0 lb/ft³, a water uptake from 300% to 700% based on change in weight after submersion in water for one minute at room temperature, and an air flow from 1.5 to 3.5 scfm.

10. A mattress including a layer formed of the polyurethane foam as claimed in claim 1, wherein the layer has a density from 4.0 lb/ft³ to 9.0 lb/ft³, a water uptake from 300% to 700% based on change in weight after submersion in water for one minute at room temperature, and an air flow from 1.5 to 3.5 scfm.

* * * * *